(12) United States Patent
Cao et al.

(10) Patent No.: US 8,617,682 B2
(45) Date of Patent: Dec. 31, 2013

(54) DEVICE HOUSING AND METHOD FOR MAKING THE DEVICE HOUSING

(75) Inventors: Da-Hua Cao, Shenzhen (CN); Xu Liu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/593,621

(22) Filed: Aug. 24, 2012

(65) Prior Publication Data

US 2013/0122224 A1     May 16, 2013

(30) Foreign Application Priority Data

Nov. 14, 2011   (CN) .......................... 2011 1 0359319

(51) Int. Cl.
*B29D 22/00* (2006.01)

(52) U.S. Cl.
USPC ....................................... 428/36.91; 428/35.7

(58) Field of Classification Search
USPC ............................. 428/35.7, 36.91, 674, 34.1
See application file for complete search history.

(56) References Cited

U.S. PATENT DOCUMENTS

| | | | |
|---|---|---|---|
| 6,398,925 B1 * | 6/2002 | Arbab et al. | 204/192.22 |
| 2009/0202862 A1 * | 8/2009 | Chen et al. | 428/674 |
| 2013/0122224 A1 * | 5/2013 | Cao et al. | 428/35.7 |

* cited by examiner

*Primary Examiner* — N. Edwards
(74) *Attorney, Agent, or Firm* — Altis Law Group, Inc.

(57) ABSTRACT

A device housing is provided. The device housing includes a substrate, a base paint layer formed on the substrate, a silver layer formed on the base paint layer, and a protective layer directly formed on the silver layer. A method for making the device housing is also provided.

9 Claims, 1 Drawing Sheet

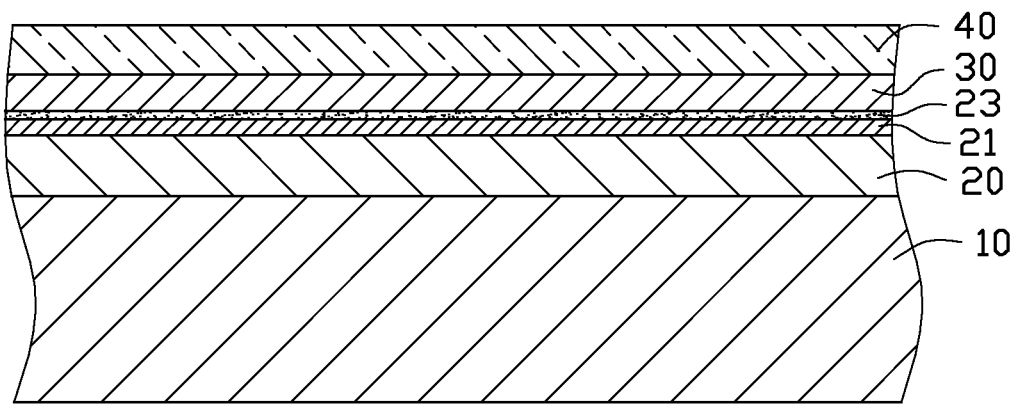

DEVICE HOUSING AND METHOD FOR MAKING THE DEVICE HOUSING

BACKGROUND

1. Technical Field

The present disclosure relates to device housing and a method for making the device housing.

2. Description of Related Art

Housings of electronic devices, such as mobile phones, are commonly decorated with decorative layers formed by surface treatments. The surface treatments may be anodizing, electrophoresis, and painting. However, the decorative layers formed by the mentioned surface treatments are not always aesthetically pleasing.

Therefore, there is room for improvement within the art.

BRIEF DESCRIPTION OF THE DRAWING

Many aspects of the disclosure can be better understood with reference to the following FIGURE. The components in the FIGURE are not necessarily drawn to scale, the emphasis instead being placed upon clearly illustrating the principles of the disclosure.

The FIGURE is a cross-sectional view of an exemplary embodiment of a device housing.

DETAILED DESCRIPTION

Referring to the FIGURE, a device housing 100 according to an exemplary embodiment is shown. The device housing 100 includes a substrate 10, a base paint layer 20 directly formed on the substrate 10. A sensitization layer 21 directly formed on the base pain layer 20, an activation layer 23 directly formed on the sensitization layer 21, a silver layer 30 directly formed on the activation layer 23, and a protective layer 40 directly formed on the silver layer 30.

The substrate 10 may be made of metal or non-metal. The metal may be aluminum, aluminum alloy, magnesium, or magnesium alloy, for example. The non-metal may be plastic, for example.

The base paint layer 20 contains mainly acrylic acid epoxy resin.

The sensitization layer 21 is a thin gel layer containing hydroxide di-tin chloride ($Sn_2(OH)_3Cl$). The $Sn_2(OH)_3Cl$ has reducibility.

The activation layer 23 contains palladium (Pd) ions. The activation layer 23 is evenly dispersed on the sensitization layer 21.

The protective layer 40 is a transparent or translucent resin layer and is for protecting the silver layer 30 from being scratched.

A method for making the device housing 100 may include the following steps.

The substrate 10 is provided and surface treated. The surface treatments for the substrate 10 may be degreasing first and then polishing.

The base paint layer 20 is sprayed on the substrate 10. The paint or coating used for forming the base paint layer 20 may contain mainly acrylic acid epoxy resin. The spraying pressure of the paint or coating for the base paint layer 20 is about 1200 Pa. The spraying of the base paint layer 20 lasts for about 2.4 seconds. During the spraying, the distance between the substrate 10 and the spray gun (not shown) for spraying the base paint layer 20 is about 20 mm. The base paint layer 20 smoothens the substrate 10.

The substrate 10 having the base paint layer 20 is baked in an oven (not shown) having an internal temperature of about 88° C. for about 30 minutes.

The base paint layer 20 is sensitizing treated to form the sensitization layer 21. The sensitizing treatment is carried out by spraying sensitizing water solution to the base paint layer 20. The sensitizing water solution contains hydrochloric acid having a concentration of about 250 g/L to about 400 g/L, tin dichloride having a concentration of about 50 g/L to about 100 g/L, and potassium sodium tartrate having a concentration of about 80 g/L to about 160 g/L. The components contained in the sensitizing water solution react to generate the $Sn_2(OH)_3Cl$ gel. In the sensitizing water solution, the potassium sodium tartrate acts as a complexant to prevent the bivalent tin of the tin dichloride from oxidizing to tetravalent tin.

The base paint layer 20 is activating treated to form the activation layer 23. The activating treatment is carried out by dipping the base paint layer 20 having the sensitization layer 21 in an activating water solution for about 5 seconds to about 20 seconds. The activating water solution contains hydrochloric acid having a concentration of about 20 g/L to about 50 g/L, and palladium chloride having a concentration of about 0.1 g/L to about 0.5 g/L. The Pd ions contained in the activation layer 23 act as a catalyst which accelerate the subsequent silver mirror reaction.

The substrate 10 having the activation layer 23 is washed and then baked in the oven (not shown) having an internal temperature of about 88° C. for about 30 minutes.

The silver layer 30 is formed on the activation layer 23. A first water solution and a second water solution are provided. The first water solution contains silver nitrate having a concentration of about 20 g/L to about 40 g/L, and ammonia water having a concentration of about 30 g/L to about 50 g/L. The second water solution contains potassium sodium tartrate having a concentration of about 80 g/L to about 100 g/L, and sodium hydroxide having a concentration of about 10 g/L to about 20 g/L. The first water solution and the second water solution are heated from about 90° C. to about 110° C. and then simultaneously sprayed to the activation layer 23. Then a silver mirror reaction is generated between the components of the first and second water solutions, thereby forming the silver layer 30 on the activation layer 23. The spraying process may last for about 10 seconds to about 20 seconds. The spraying pressure of the first and second water solution is about 1000 Pa to about 1500 Pa. The potassium sodium tartrate of the second water solution acts as a reductant during the silver mirror reaction.

The substrate 10 having the silver layer 30 is washed and then baked in an oven (not shown) having an internal temperature of about 60° C. for about 30 minutes.

The protective layer 40 is sprayed on the silver layer 30 using transparent or translucent coating, such as acrylic acid epoxy resin coating. The spraying pressure of the coating for the protective layer 40 is about 1200 Pa. The spraying of the protective layer 40 lasts for about 2.4 seconds. During the spraying, the distance between the substrate 10 and the spray gun (not shown) for spraying the protective layer 40 is about 20 mm. The substrate 10 having the protective layer 40 is then baked in the oven (not shown) having an internal temperature of about 88° C. for about 30 minutes to finish the device housing 100.

Specific examples of making the device housing 100 are described below. The forming and baking of the base paint layer 20 and the protective layer 40 in these specific examples may be substantially the same as described above so it is not described here again The specific examples mainly emphasize the specific concentrations of the water solutions and different process parameters for the sensitizing treatment, the activating treatment, and the spraying of the silver layer 30.

EXAMPLE 1

The substrate 10 was made of magnesium alloy.

Sensitizing treatment: the hydrochloric acid of the sensitizing water solution had a concentration of 250 g/L, tin dichloride had a concentration of 55 g/L, and potassium sodium tartrate had a concentration of 80 g/L.

Activating treatment: in the activating water solution, the palladium chloride had a concentration of 0.15 g/L, and the hydrochloric acid had a concentration of 20 g/L; the dipping process lasted for 5 seconds.

Spraying the silver layer 30: in the first water solution, the silver nitrate had a concentration of 25 g/L, and the ammonia water had a concentration of 35 g/L; in the second water solution, the potassium sodium tartrate had a concentration of 85 g/L, and the sodium hydroxide had a concentration of 12 g/L; the first and the second water solution was heated to 100° C.; the spraying pressure of the first and the second water solution was 1100 Pa; the spraying process lasted for 15 seconds; the silver layer 30 was baked at an internal oven temperature of about 60° C. for about 30 minutes.

EXAMPLE 2

The substrate 10 was made of aluminum alloy.

Sensitizing treatment: the hydrochloric acid of the sensitizing water solution had a concentration of 300 g/L, tin dichloride had a concentration of 80 g/L, and potassium sodium tartrate had a concentration of 120 g/L.

Activating treatment: in the activated water solution, the palladium chloride had a concentration of 0.30 g/L, and the hydrochloric acid had a concentration of 35 g/L; the dipping process lasted for 8 seconds.

Spraying the silver layer 30: in the first water solution, the silver nitrate had a concentration of 30 g/L, and the ammonia water had a concentration of 40 g/L; in the second water solution, the potassium sodium tartrate had a concentration of 95 g/L, and the sodium hydroxide had a concentration of 10 g/L; the first and the second water solution was heated to 95° C.; the spraying pressure of the first and the second water solution was 1200 Pa; the spraying process lasted for 10 seconds; the silver layer 30 was baked at an internal oven temperature of about 60° C. for about 30 minutes.

EXAMPLE 3

The substrate 10 was made of plastic.

Sensitizing treatment: the hydrochloric acid of the sensitizing water solution had a concentration of 400 g/L, tin dichloride had a concentration of 100 g/L, and potassium sodium tartrate had a concentration of 160 g/L.

Activating treatment: in the activated water solution, the palladium chloride had a concentration of 0.40 g/L, and the hydrochloric acid had a concentration of 50 g/L; the dipping process lasted for 10 seconds.

Spraying the silver layer 30: in the first water solution, the silver nitrate had a concentration of 35 g/L, and the ammonia water had a concentration of 45 g/L; in the second water solution, the potassium sodium tartrate had a concentration of 90 g/L, and the sodium hydroxide had a concentration of 15 g/L; the first and the second water solution was heated to 105° C.; the spraying pressure of the first and the second water solution was 1400 Pa; the spraying process lasted for 20 seconds; the silver layer 30 was baked at an internal oven temperature of about 60° C. for about 30 minutes.

The device housing 100 of the exemplary embodiments define a silver layer 30 to provide the device housing 100 a silvery white and metallic appearance. Furthermore, the silver layer 30 can highly reflect light, which renders the device housing 100 high gloss.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A device housing, comprising:
   a substrate;
   a base paint layer made of paint formed on the substrate;
   a silver layer formed on the base paint layer; and
   a protective layer directly formed on the silver layer.

2. The device housing as claimed in claim 1, further comprising a sensitization layer directly formed on the base paint layer.

3. The device housing as claimed in claim 2, wherein the sensitization layer is a gel layer containing $Sn_2(OH)_3Cl$.

4. The device housing as claimed in claim 2, further comprising an activation layer directly dispersed on the sensitization layer, the silver layer is directly formed on the activation layer and the sensitization layer.

5. The device housing as claimed in claim 4, wherein the activation layer contains palladium ions.

6. The device housing as claimed in claim 1, wherein the base paint layer comprises acrylic acid epoxy resin.

7. The device housing as claimed in claim 1, wherein the protective layer is a paint layer comprising transparent or translucent resin.

8. The device housing as claimed in claim 1, wherein the substrate is made of metal.

9. The device housing as claimed in claim 8, wherein the metal is aluminum, aluminum alloy, magnesium, or magnesium alloy.

* * * * *